US012708907B2

(12) United States Patent
Le Cras et al.

(10) Patent No.: US 12,708,907 B2
(45) Date of Patent: Aug. 18, 2026

(54) LINER EQUIPMENT

(71) Applicant: Metso Finland Oy, Espoo (FI)

(72) Inventors: Jared Le Cras, Thornlie (AU); Bjorn Nielsen, Inglewood (AU)

(73) Assignee: Metso Finland Oy, Espoo (FI)

(*) Notice: Subject to any disclaimer, the term of this patent is extended or adjusted under 35 U.S.C. 154(b) by 261 days.

(21) Appl. No.: 18/262,998

(22) PCT Filed: Feb. 8, 2022

(86) PCT No.: PCT/EP2022/052983

§ 371 (c)(1),
(2) Date: Jul. 26, 2023

(87) PCT Pub. No.: WO2022/171610

PCT Pub. Date: Aug. 18, 2022

(65) Prior Publication Data

US 2024/0307889 A1 Sep. 19, 2024

(30) Foreign Application Priority Data

Feb. 11, 2021 (SE) .................................... 2150152-3

(51) Int. Cl.
*B02C 23/00* (2006.01)
*B25J 9/04* (2006.01)
(Continued)

(52) U.S. Cl.
CPC ............... *B02C 23/00* (2013.01); *B25J 9/042* (2013.01); *B25J 9/1684* (2013.01); *B25J 18/025* (2013.01); *B02C 17/22* (2013.01); *B02C 2210/02* (2013.01)

(58) Field of Classification Search
None
See application file for complete search history.

(56) References Cited

U.S. PATENT DOCUMENTS 8,016,220 B2 * 9/2011 Melo ........................ B02C 17/22 241/183
10,232,801 B2 * 3/2019 Chewning ............... B60R 13/01
(Continued)

FOREIGN PATENT DOCUMENTS

CA 3125062 A1 7/2020
WO 2015010163 A1 1/2015

OTHER PUBLICATIONS

Final Notice issued in corresponding Swedish Patent Application No. 2150152-3, dated Aug. 16, 2023.

(Continued)

*Primary Examiner* — Hua Lu
(74) *Attorney, Agent, or Firm* — Andrus Intellectual Property Law, LLP

(57) ABSTRACT

The disclosure relates to a method for positioning a wear element relative to a supporting structure using a multi axis wear element positioning equipment having a wear element positioning unit. The method includes the steps of arranging a wear element positioning equipment in a replacement position relative to the supporting structure. The coordinates of an intersection point are defined where the virtual line intersects a surface of the supporting structure. The wear element positioning unit is aligned with the surface of the supporting structure at the intersection point such that a connecting surface of the wear element carried by the wear element positioning unit matches with a corresponding connecting surface of the supporting structure at the intersection point. The disclosure further relates to a system for positioning a wear element relative to a supporting structure.

42 Claims, 9 Drawing Sheets

(51) Int. Cl.
*B25J 9/16* (2006.01)
*B25J 18/02* (2006.01)
*B02C 17/22* (2006.01)

(56) References Cited

U.S. PATENT DOCUMENTS 10,457,344 B2 * 10/2019 Sadri .................... B62D 65/06
2008/0032610 A1 * 2/2008 Chacko .................... B24C 5/04 239/433
2009/0162137 A1 * 6/2009 Musschoot ............ B02C 17/22 403/24
2010/0171824 A1 * 7/2010 Utsumi ............. H05K 13/0812 348/95
2010/0332016 A1 * 12/2010 Abrams ................ B25J 9/1684 901/41
2012/0061182 A1 * 3/2012 Grimes .................... E06C 7/50 16/332
2013/0140387 A1 * 6/2013 Fernandez ............. B02C 17/22 241/300
2017/0334031 A1 * 11/2017 McPhee ................. B24B 3/022
2018/0274352 A1 * 9/2018 Orban .................... E21B 44/04
2019/0234208 A1 * 8/2019 Orban .................... E21B 21/12
2020/0228038 A1 * 7/2020 Takahashi ............... H02K 1/16
2020/0391219 A1 * 12/2020 Faulkner .............. B01F 27/922
2022/0062915 A1 * 3/2022 Salamanca Poblete ... B25J 5/02
2023/0356234 A1 * 11/2023 Gray ...................... B02C 17/22

OTHER PUBLICATIONS

International Search Report and Written Opinion for PCT/EP2022/052983, mailed May 11, 2022.

Office Action for European Patent Application No. 22704376.7, mailed Sep. 23, 2024.

* cited by examiner 105
103
102
106
104
300
101
107
150
200
202

200
150
109
150
201
103
102
107
104
300
203
106
100
108
101
202

LINER EQUIPMENT

CROSS-REFERENCE TO RELATED APPLICATIONS

This application is the U.S. national stage application of International Application PCT/EP2022/052983, filed Feb. 8, 2022, which international application was published on Aug. 18, 2022, as International Publication WO 2022/171610 A1 in the English language. The International Application claims priority Swedish Patent Application No. 2150152-3 filed Feb. 11, 2021.

FIELD OF THE DISCLOSURE

The present disclosure relates to a system and a method for positioning a wear element relative to a supporting structure. The system comprises a multi axis wear element positioning equipment having a wear element positioning unit used for positioning a wear element relative to a support structure.

BACKGROUND ART

In many applications, it is necessary to regularly replace worn out or broken wear elements before an underlying support structure becomes damaged. Often, such wear elements are of substantial size and weight and cannot be handled manually and therefore different types of positioning equipment are used to carry and position wear elements adjacent to the supporting structure such that the wear element can be fastened to the support structure by means of bolt connections or similar. Even though such equipment removes the need for operators to lift and carry heavy equipment and parts, such positioning equipment is still demanding to operate since they often need to be operable in as many as seven or more degrees of freedom. Manually operating all degrees of freedom is a challenging task and requires significant operator skills. As a result, correctly operating the machine to align the wear elements with the supporting structure is a frequent cause of lost time.

To enable a reduction in the time required for replacement of such wear elements, one type of prior art equipment comprises a solution in which sensors are used that provide visual feedback about the alignment situation to the operator. This solution, however, still requires that the operator has sufficient skill to respond to the feedback and manoeuvre the wear element positioning unit accordingly such that the positioning of the wear element still takes considerable time.

SUMMARY

It is an object to mitigate, alleviate or eliminate one or more of the above-identified deficiencies and disadvantages in the art singly or in any combination and to solve at least the above mentioned problem. According to a first aspect there is provided a system for positioning a wear element relative to a supporting structure. The system comprises a multi axis wear element positioning equipment having a wear element positioning unit, wherein the wear element positioning equipment can be arranged in a replacement position relative to the supporting structure. The system further comprises processing means which is arranged to determine coordinates of an intersection point where a virtual line originating from the multi axis wear element positioning equipment intersects a surface of the supporting structure. The processing means is further arranged to automatically determine an orientation of the wear element positioning unit in which the wear element positioning unit is aligned with the surface of the supporting structure at the intersection point such that a connecting surface of the wear element carried by the wear element positioning unit matches with a corresponding connecting surface of the supporting structure at the intersection point. The processing means being configured to control an aligning means to orient the wear element positioning unit accordingly.

The system may be advantageous as it avoids the need for the operator to perform the complete actual alignment procedure. Instead, the system as such is configured to perform at least parts of the alignment based on calculations made in the processing means. This could save significant amounts of time during replacement of wear elements. This since the final adjustments prior to placement of the wear element at the supporting structure are in fact the most complicated. At this point, all available degrees of freedom of the multi axis wear element positioning equipment are required to move the wear element towards the supporting structure while simultaneously adjusting the orientation of the wear element such that the corresponding surfaces of the wear element and the supporting structure match each other. The adjustment of orientation of the wear element is particularly time consuming and often a large number of wear elements need to be replaced such that down time of for example a grinding mill can be substantial.

According to some embodiments, the virtual line originates from the multi axis wear element positioning equipment.

According to some embodiments, the virtual line is defined by a pointing direction of the wear element positioning unit.

According to some embodiments, the virtual line originates from an attachment point of the wear element positioning unit to the multi axis wear element positioning equipment. This makes it easy for an operator to direct the wear element positioning unit towards a desired location on the supporting structure.

According to some embodiments, the yaw angle, roll angle and pitch angle of the wear element positioning unit can be adjusted by the aligning means. This is advantageous in that the wear element can be aligned by means of movements at the wear element positioning unit, also known as the grapple or grapple head, only. By adjusting these three degrees of freedom it is possible to orientate the wear element correctly relative to the surface of the supporting structure.

According to some embodiments, the wear element positioning unit is arranged on a telescopically extendable crane. A telescopic crane can provide the required load capacity and sufficient reach for all parts where wear elements need to be replaced.

According to some embodiments, a yaw angle of the wear element positioning unit can be adjusted by an operator. By adjusting the yaw of the wear element positioning unit, the direction of the virtual line can be adjusted.

According to some embodiments, a slew angle, a luff angle, and a telescopic extension of the telescopically extendable crane can be adjusted by an operator. Similar to the yaw, these can be used by the operator to adjust the direction of the virtual line and thus the location of the intersection point at the support structure. They can be used individually or in any combination thereof.

According to some embodiments, a common coordinate system of the multi axis wear element positioning equipment and the supporting structure emanates in the origin of the telescopically extendable crane. Since the crane can be provided in a fixed and known position relative to the supporting structure, the position of the origin of the common coordinate system relative to the support structure is also known at all times. Based on that and the structural dimensions of the multi axis wear element positioning equipment and the supporting structure, the position of the wear element can be defined in this coordinate system.

According to some embodiments, the position of the intersection point can be adjusted by adjusting one or more of the following: the yaw of the wear element positioning unit; the slew angle of the telescopically extendable crane; the luff angle of the telescopically extendable crane, and; the telescopic extension of the crane.

According to some embodiments, the supporting structure comprises a grinding mill. The inside of grinding mills are often covered with wear elements in the form of lining elements. The environment within these mills is highly corrosive and dangerous and it would be desirable to reduce the amount of time staff has to spend in or near such mills. Also, downtime of such grinding mills is very expensive.

According to some embodiments, the grinding mill can be divided into distinct sections. Grinding mills are typically shaped with a central cylindrical section and two conical end sections. However, some grinding mills have flat ends and this embodiment is also covered herein.

According to some embodiments, the distinct sections comprise a feed head; a shell; and a discharge head. The feed and discharge heads are typically conical and the shell is cylindrical.

According to some embodiments, separate common coordinate systems are defined for each of the distinct sections and the wear element positioning equipment. Due to the differences in shape, it is advantageous to use separate coordinate systems.

According to some embodiments, the position of the intersection point determines which common coordinate system that shall apply.

According to some embodiments, an operator manually moves the wear element positioning unit and directs the virtual line towards an intended placement location on the surface of the supporting structure and the aligning means is configured to continuously adapt the orientation of the wear element positioning unit based on that intended placement location. This has the advantage that the wear element is maintained in an orientation that would allow it to be fastened to the support structure. This is particularly advantageous when the wear element is in a position near the support structure, i.e. in a final stage of the positioning of the wear element.

According to some embodiments, an operator manually moves the wear element positioning unit and directs the virtual line towards an intended placement location on the surface of the supporting structure and the aligning means is configured to adapt the orientation of the wear element positioning unit in response to an operation of an alignment actuator. This has the advantage that the orientation of the wear element is not continuously re-arranged. Such rearrangement is not always necessary, for example in an early stage of the positioning of the wear element, close to the pick-up station of wear elements.

According to some embodiments, the processing means is configured to define a second coordinate system having its origin in the intersection point between the virtual line and the surface of the supporting structure.

According to a second aspect, there is provided a method for orienting a wear element relative to a supporting structure using a multi axis wear element positioning equipment having a wear element positioning unit. The method comprises the steps of:

- arranging a wear element positioning equipment in a replacement position relative to the supporting structure;
- defining coordinates of an intersection point where a virtual line originating from the multi axis wear element positioning equipment intersects a surface of the supporting structure;
- align the wear element positioning unit with the surface of the supporting structure at the intersection point such that a connecting surface of the wear element carried by the wear element positioning unit matches with a corresponding connecting surface of the supporting structure at the intersection point (Q).

The method may be advantageous as it aligns the wear element with the surface of the support structure at the intersection point of the virtual line and the surface of the support structure, i.e. at the intended placement location, such that the orientation of the wear element is ready to be fastened as if it was already at the attachment point of the support structure.

According to some embodiments, processing means are applied to define the coordinates system and define the intersection point where the virtual line intersects a surface of the supporting structure and wherein the processing means is further applied to determine an alignment orientation in which the wear element positioning unit is aligned with the surface of the supporting structure at the intersection point such that the connecting surface of the wear element carried by the wear element positioning unit matches with the corresponding connecting surface of the supporting structure at the intersection point, the processing means being configured to control aligning means to orientate the wear element positioning unit accordingly.

According to some embodiments, the virtual line is defined by directing the wear element positioning unit towards the surface of the supporting structure.

According to some embodiments, the virtual line originates from an attachment point of the wear element positioning unit to the multi axis wear element positioning equipment.

According to some embodiments, a yaw angle, a roll angle and a pitch angle of the wear element positioning unit can be adjusted by the aligning means.

According to some embodiments, the wear element positioning unit is arranged on a telescopically extendable crane.

According to some embodiments, the yaw of the wear element positioning unit can be adjusted by an operator.

According to some embodiments, a slew angle of the telescopically extendable crane can be adjusted by an operator.

According to some embodiments, a luff angle of the telescopically extendable crane can be adjusted by an operator.

According to some embodiments, a telescopic extension of the telescopically extendable crane can be adjusted by an operator.

According to some embodiments, a common coordinate system for the multi axis wear element positioning equipment and the supporting structure emanates in the origin of the telescopically extendable crane.

According to some embodiments, adjustment of the position of the intersection point is done by adjusting one or more of the following: the yaw of the wear element positioning unit; the slew angle of the telescopically extendable crane; the luff angle of the telescopically extendable crane; the telescopic extension of the crane; and the telescopic extension of the beam.

According to some embodiments, the supporting structure comprises a grinding mill.

According to some embodiments, the grinding mill can be divided into distinct sections.

According to some embodiments, the distinct sections comprise a feed head; a shell; and a discharge head.

According to some embodiments, separate common coordinate systems are defined for each of the distinct sections and the wear element positioning equipment.

According to some embodiments, the position of the intersection point determines which common coordinate system that shall apply.

According to some embodiments, if the processing means determines that the virtual line is directed towards a liner pick-up position, the wear element positioning equipment is automatically positioned into a liner pickup configuration.

According to some embodiments, an operator directs the wear element positioning unit towards a surface of the supporting structure and wherein the aligning means continuously adapts the position of the wear element positioning unit. This has the advantage that the wear element is always arranged in a position that would allow it to be fastened to the support structure. This is particularly advantageous when the wear element is in a position near the support structure, i.e. in a final stage of the positioning of the wear element.

According to some embodiments, an operator directs the wear element positioning unit towards a surface of the supporting structure and wherein the aligning means adapts the position of the wear element positioning unit in response to an operation of an alignment actuator. This has the advantage that the wear element is not always re-arranged. Such re-arrangement is not always necessary, for example in an early stage of the positioning of the wear element, close to the pick-up station of wear elements.

According to some embodiments, a second coordinate system is defined having its origin in the intersection point between the virtual line and the surface of the supporting structure.

Effects and features of the second aspect are largely analogous to those described above in connection with the first aspect. Embodiments mentioned in relation to the first aspect are largely compatible with the second aspect. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The disclosure will by way of example be described in more detail with reference to the appended [schematic] drawings, which show presently preferred embodiments of the disclosure.

Figure 6A:
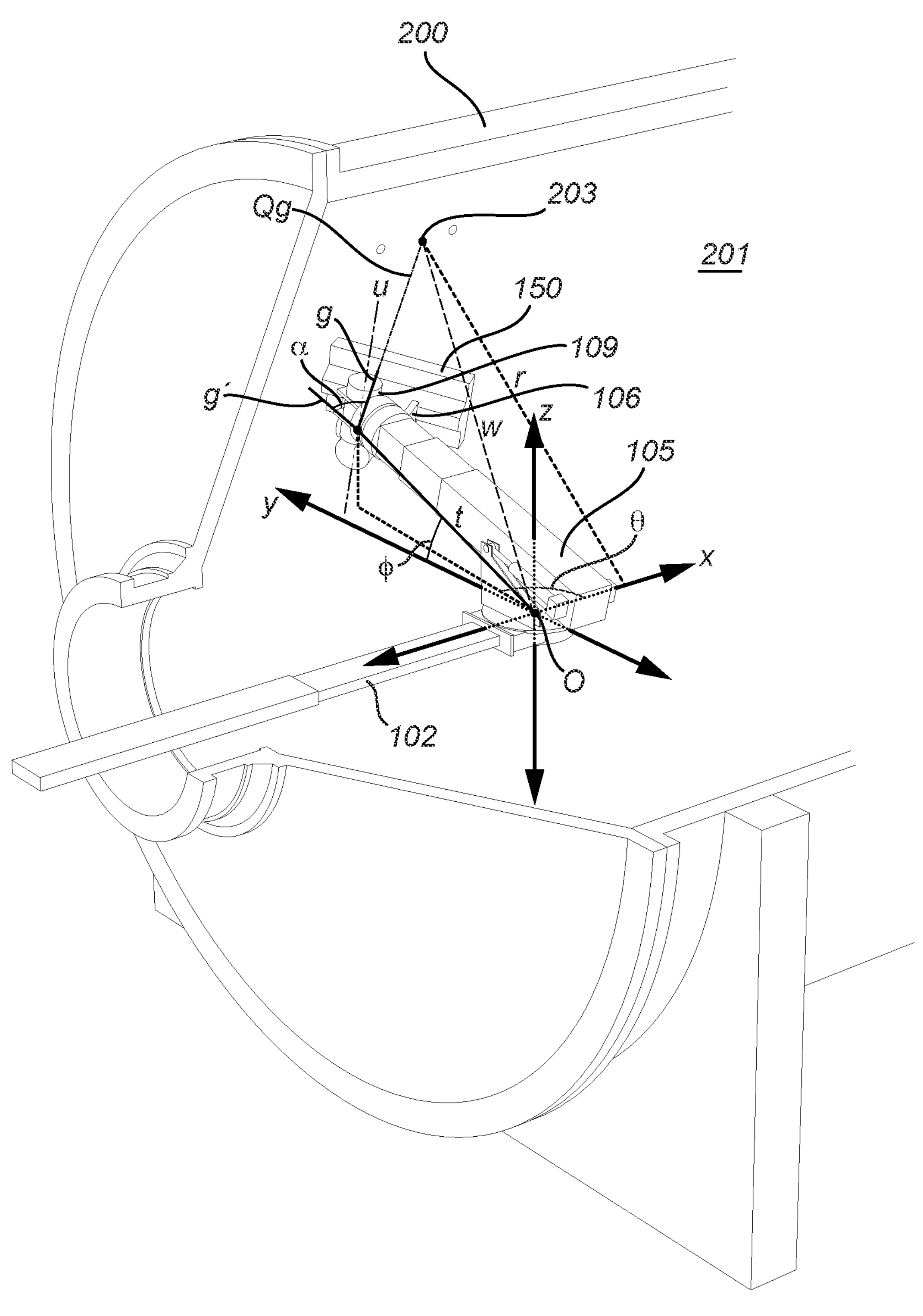
Figure 6B:
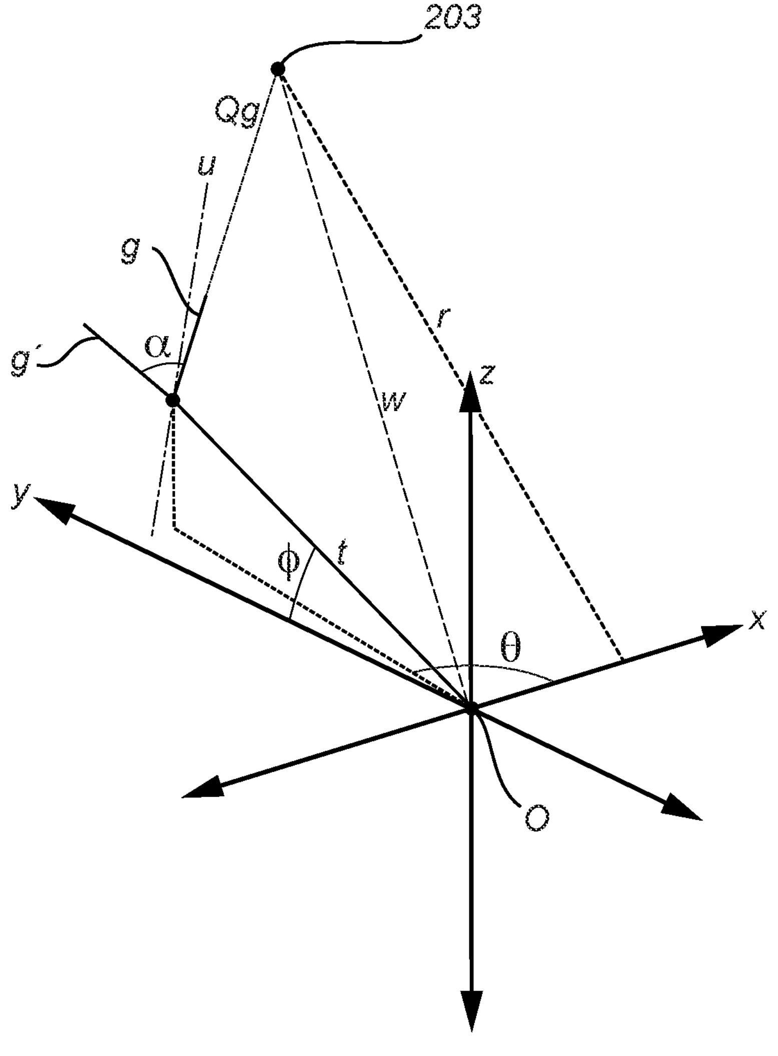

FIGS. 6*a* and 6*b* illustrate a coordinate system useful for implementing embodiments of the present disclosure.

Figure 7A:
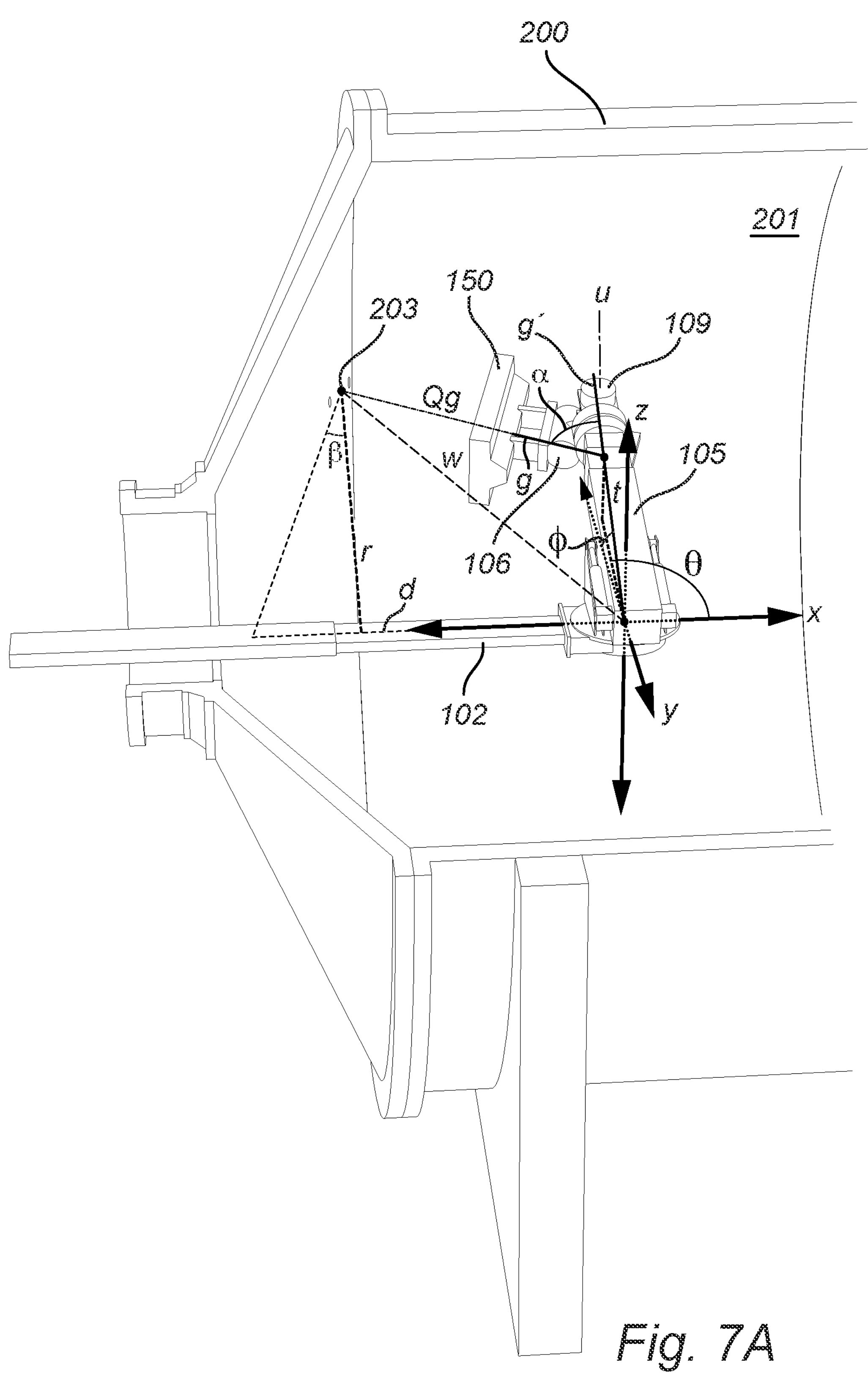
Figure 7B:
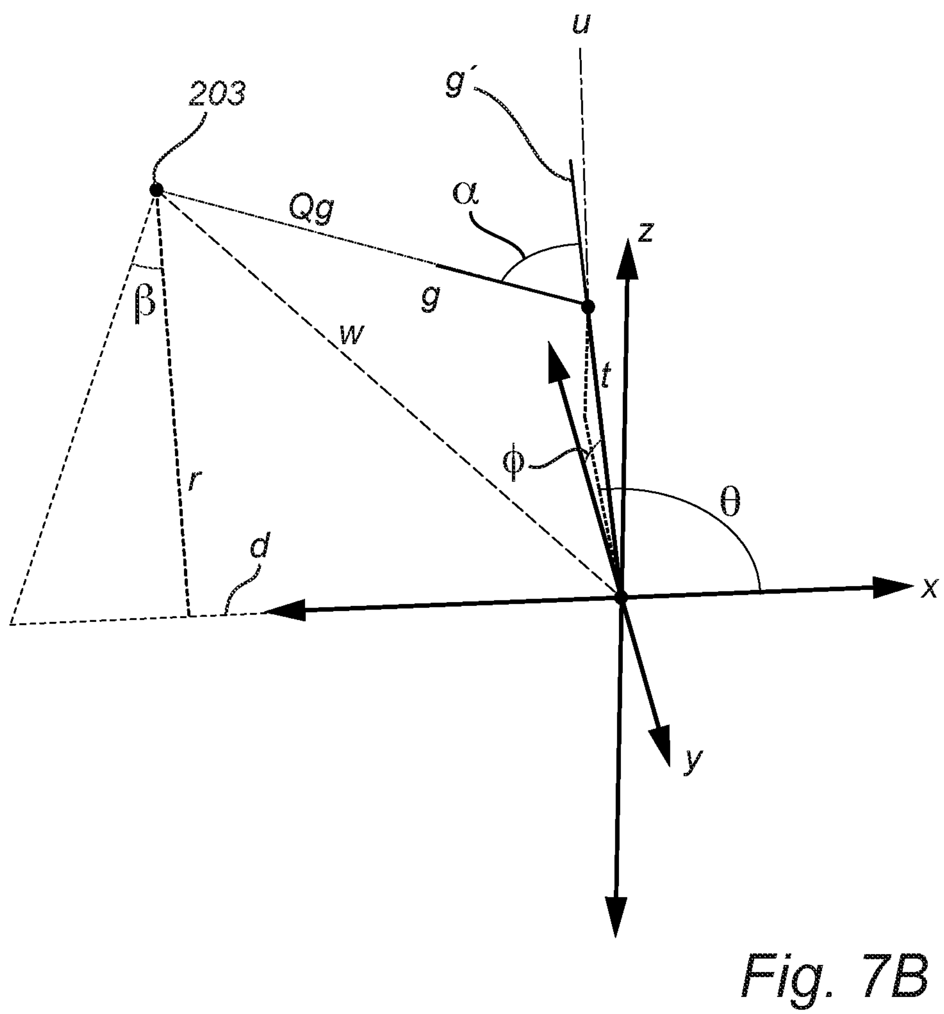

FIGS. 7*a* and 7*b* illustrate another coordinate system useful for implementing embodiments of the present disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person. It should be noted that all embodiments herein show and describe grinding mills with replaceable wear lining elements. It is however obvious to the skilled person that other applications are equally suitable for the present invention. For example in other types of comminution equipment using replaceable wear elements, in particular equipment where such wear elements are to be attached to non-planar surfaces or planar surfaces arranged in varied directions.

Figure 1:
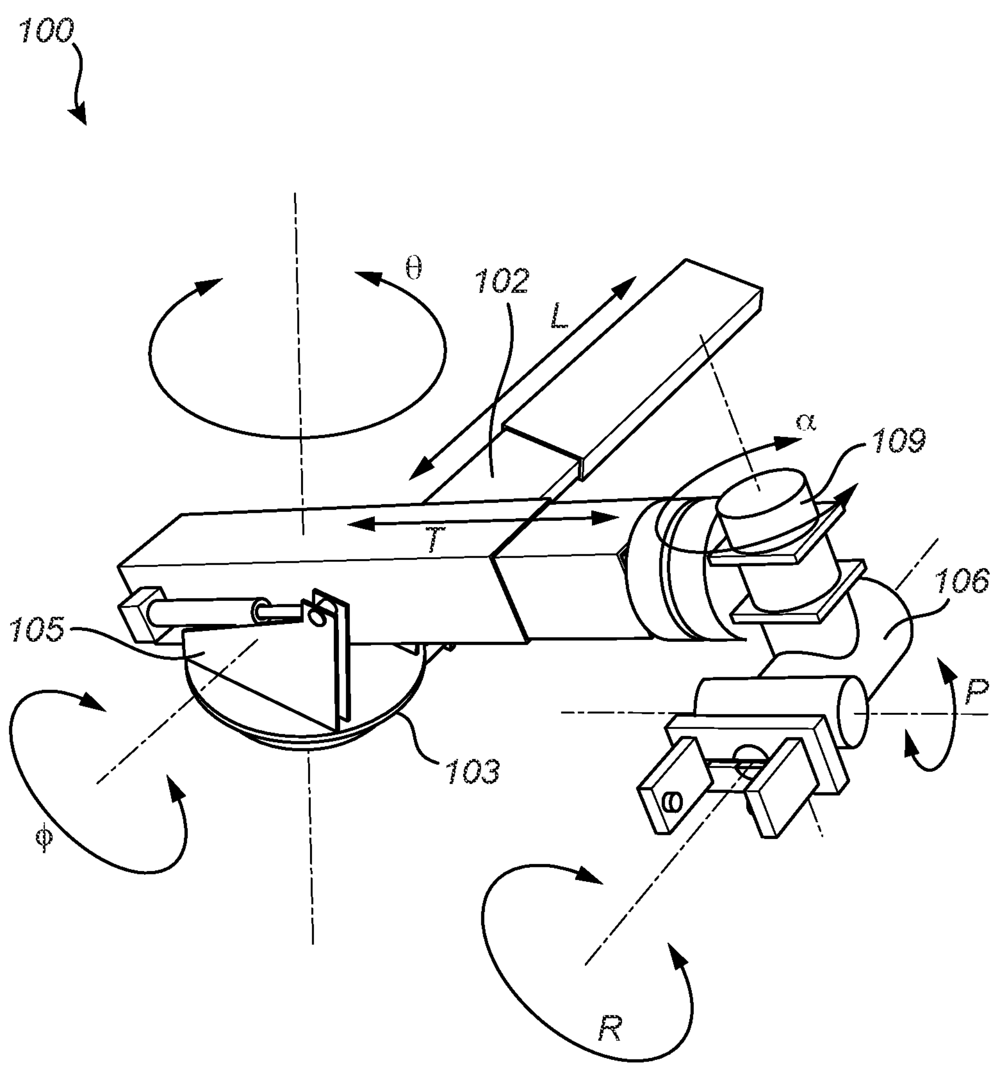
FIG. 1 shows a perspective view of the system for positioning a wear element according to an embodiment of the present disclosure.

FIG. 1 shows a schematic, perspective view of a system 100 for positioning a wear element relative to a supporting structure of for example a grinding mill, not shown in FIG. 1. The system is sometimes called a Mill Reline Machine (MRM) 100. To be able to navigate and reach all parts within for example a grinding mill, these systems typically have a large number of degrees of freedom. The system in FIG. 1 is shown to have seven degrees of freedom which can be considered quite normal for this type of application but embodiments having further or less degrees of freedom are both conceivable. The first degree of freedom L is realized by a telescopically extendable and retractable beam 102. At one end 103 of beam 102, a crane 105 is attached. The crane 105 can be telescopically extended, see item T in FIG. 1, as well as positioned with respect to slew angle (θ) and luff angle (φ) thereby defining 3 further degrees of freedom. At a distal end of the crane 105, a 3-axis wear element positioning unit 106, also called grapple, or grapple head 106 is arranged, defining the last three degrees of freedom; yaw angle α, roll angle R and pitch angle P. Previous solutions, requiring an operator to control all seven degrees of freedom have been found to involve considerable amounts of time lost, especially during final adjustments of the 3-axis grapple head 106 to orientate the wear element in a manner matching the surface of the supporting structure, for example an inner surface of a grinding mill.

Figure 2:
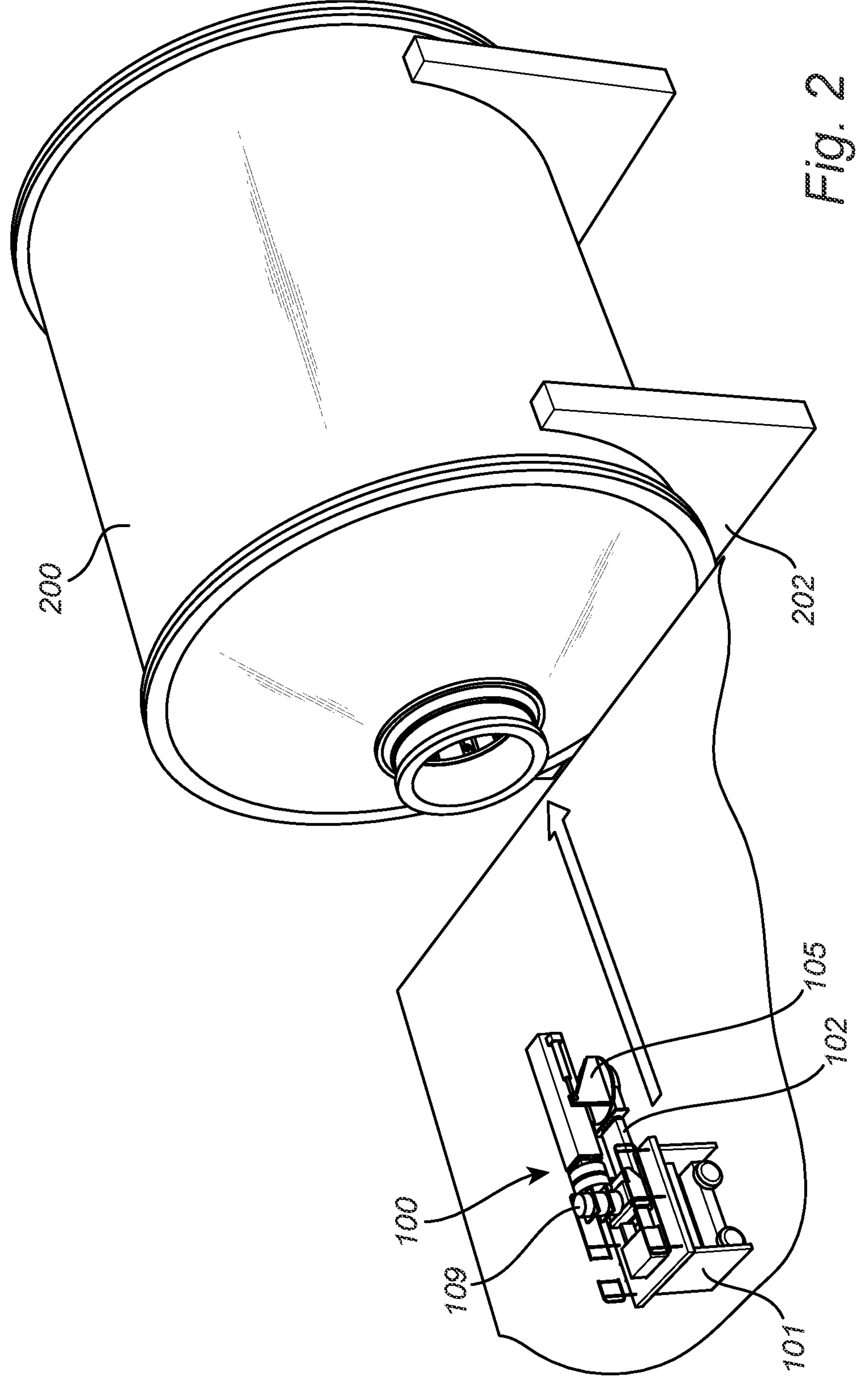
FIG. 2 shows a perspective view of the system for positioning a wear element relative to a supporting structure arranged in a first position, according to an embodiment of the present disclosure.

FIG. 2 shows a grinding mill having a system 100 for positioning wear elements relative to the supporting structure of the grinding mill 200, i.e. an internal surface of the mill 200. The system is sometimes called a Mill Reline Machine (MRM) 100 which, once in position, can be fixedly mounted to the grinding mill support 202. Thus, a common coordinate system for the MRM 100 and the grinding mill 200 can be defined since the relative distances between the parts of the MRM 100 and those of the grinding mill 200 are fixed and known. In the position shown in FIG. 2, the MRM 100 is positioned outside the grinding mill 200 but not yet extending into the grinding mill 200. The MRM 100 comprises a base structure 101 which can be rolled into position in front of the grinding mill 200 and fixed to the grinding mill support 202 at pre-defined anchor points. The MRM 100 further comprises a generally horizontal beam 102 arranged to be telescopically extended into the grinding mill 200. At a proximal end 104 thereof, the beam 102 is attached to the base structure 101 and to a distal end 103 of the beam 102 a crane 105 is attached. The crane 105 can be telescopically extended T as well as positioned with respect to slew angle (θ) and luff angle (φ) (see also FIG. 1). At a distal end of the crane 105, a 3-axis grapple, or wear element positioning unit. 106 is arranged.

The grapple 106 is arranged to carry the wear element 150 and is moveable in 3 degrees of freedom; yaw α, roll R and pitch P. As will be discussed in more detail later on, the yaw α, roll R and pitch P angles can be calculated to orientate the wear element ready for placement at the placement point on the support structure, e.g. the intended placement point on the inner surface of the mill shell.

Although not shown in the figures, sensors may be configured to determine the actual value of each of the degrees of freedom. These may for example comprise linear displacement sensors to determine axial position of e.g. telescopic beam 102 and crane 105. Further, angle sensors can be applied to determine rotational position of different parts of the MRM.

The MRM further comprises a processing means 300. The processing means is configured to receive information from the different sensors which allows the processing means to determine the position and orientation of the different parts of the MRM 100 and a wear element 150 carried by the MRM by grapple 106. As the MRM is locked into a fixed and known position relative to the mill 200, the processing means can also determine the positions and orientation of the parts of the MRM relative to the mill 200. In particular, and as will be discussed in detail below, the processing means is configured to determine an orientation of the wear element positioning unit 106 relative such that a wear element 150 carried by the wear element positioning unit 106 is ready to be fitted to the inner surface of the mill 200.

Figure 3:
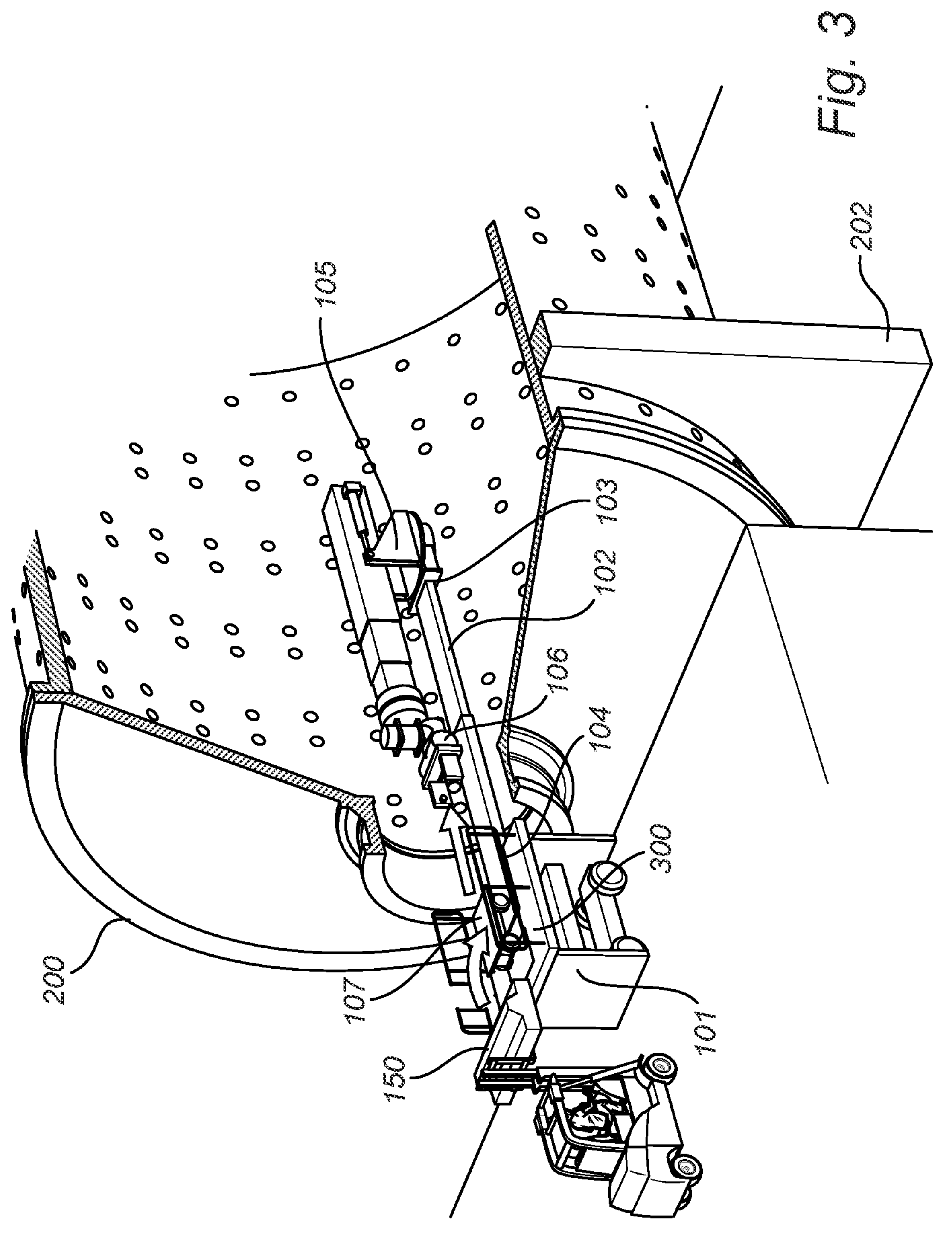
FIG. 3 shows a perspective view of the system for positioning a wear element relative to a supporting structure arranged in a second position, according to an embodiment of the present disclosure.
Figure 4:
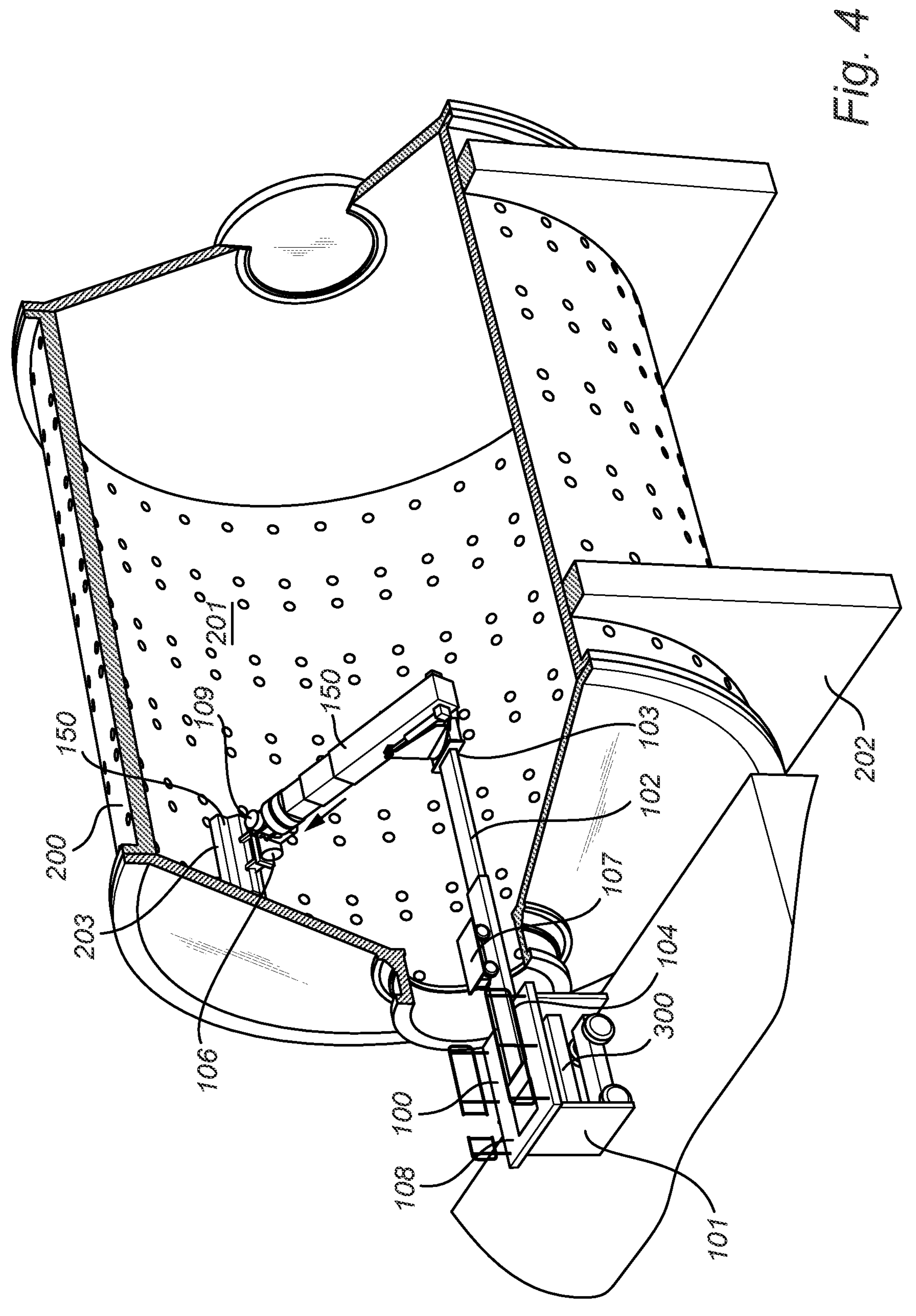
FIG. 4 shows a perspective view of the system for positioning a wear element relative to a supporting structure arranged in a third position, according to an embodiment of the present disclosure.

From the position shown in FIG. 2, the MRM (100) is ready to move into the grinding mill 200, as shown in FIGS. 3 and 4. This is done by moving base structure 101 into position in front of the opening of the mill 200 and then telescopically extending the beam 102 into the grinding mill 200. The beam 102 can preferably, but not necessarily, extend co-axially with the centre line of the grinding mill. In FIG. 3, the beam 102 has been extended into the interior of the grinding mill 200 and the grapple 106 is still facing outwardly, towards a liner cart 107 on which one or more replacement wear elements 150 can be arranged using e.g. a fork lift or an overhead crane. In this position, the MRM 100 is ready to pick up a new, unworn wear element 150 from the liner cart 107. Preferably, as the processing means 300 determines that the grapple 106 is facing the liner cart 107, the grapple 106 is automatically oriented in a liner pick-up position. This means that the grapple 106 is orientated in a manner that makes it easy for an operator to move it towards the liner cart 107 and pick up a wear element 150, such as a liner element.

Figure 5:
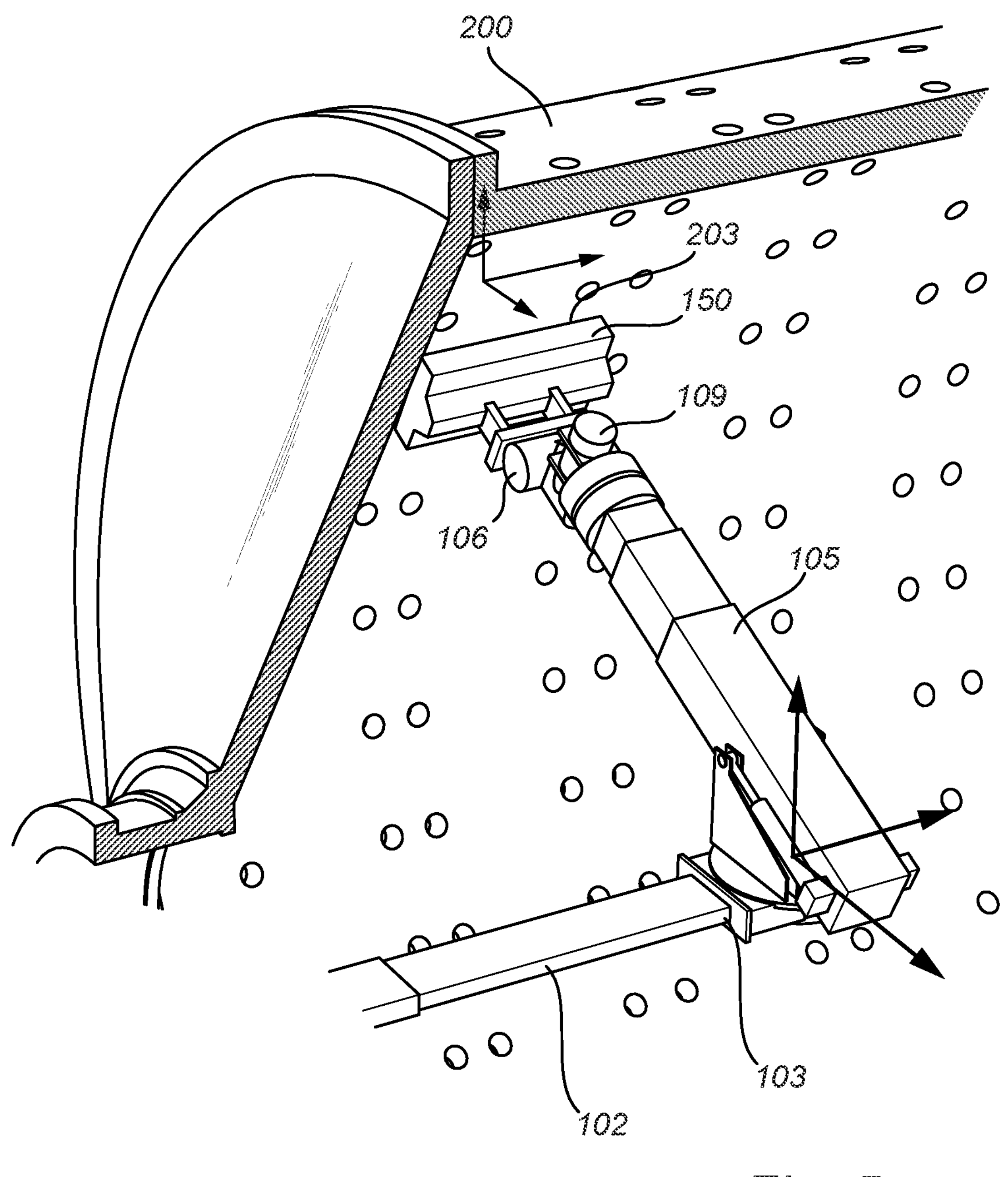
FIG. 5 shows a perspective of the system for positioning a wear element relative to a supporting structure arranged in the third position, according to an embodiment of the present disclosure.

Referring now to FIGS. 4 and 5, in which mill 200 is shown in partly open views, an implementation of the disclosure will be discussed. An operator, who typically will be standing inside the mill 200, or possibly on platform 108, can manually operate the MRM 100 using remote controlling equipment as they are known in the art. A wear element 150 has been picked up and is held by grapple 106 and the crane 105 with grapple 106 of the MRM is positioned within the mill 200. In a next step, the operator takes aim and directs the head 109 of the crane 105 towards an intended placement location 203 of the wear element on the internal surface 201 of the mill 200. This aiming, or targeting, of the head 109 towards an intended spot on the internal surface 201 of the mill can be said to follow a virtual line Qg extending from the head 109 to the placement location 203. Typically, the operator adjusts the orientation of virtual line Qg by means of the extension L of beam 102; extension T of the crane 105; crane slew angle θ; crane luff φ angle; and yaw angle α. Based on the available information from the known and fixed relationship between the MRM and the mill 200; the dimensions of the mill 200; and information from sensors, such as angle sensors and linear displacement sensors, provided on the MRM, the processing means 300 calculates the orientation of the virtual line Qg and the coordinates of the intersection point 203 of virtual line Qg and mill surface 201, also known as the placement location. Based on these coordinates, the processing means determines the orientation that a wear element 150 must have to match with the inner surface 201 of the mill 200 at placement location 203. This information is used to align the wear element 150 accordingly by means of grapple 106. This can be achieved either automatically and continuously or in response to an operator actuating an alignment actuator, such as a button provided at the remote controlling equipment. The former solution has the advantage that the operator can focus on steering the grapple towards the intended placement location and need not think about alignment of the wear element 150 at all. The latter has the advantage that this alignment of the wear element 150 is only done when it is in fact necessary, i.e. as the grapple approaches the placement location.

FIGS. **6*a* and 6*b* illustrate a coordinate system useful for implementing embodiments of this disclosure. A mill coordinate system x, y, z is defined, having its origin O located at the crane origin, i.e. the center point for the crane slew and luff rotations of the crane 105. The x axis is directed along the mill rotational axis, and the z axis is vertical. A vector between the crane origin O and the yaw actuator axis of the MRM crane head 109 is denoted t. The pointing direction of the crane boom away from the yaw actuator is indicated by a unit vector g', and g corresponds to the unit vector g' after rotation by an angle α about the yaw axis u. The distance between the yaw actuator and the inner surface of the mill 200 in the direction of the unit vector g is denoted by Q, i.e. the vector Qg corresponds to a scaled version of g so that the end of Qg lies on the inner surface of the mill 200**. The vector from the crane origin to the point on the inner surface of the mill where Qg ends is denoted by w, i.e. w=t+Qg. The radius from the rotational axis (coinciding with coordinate axis x) to the inner surface of the mill is denoted by r, and the crane slew and luff angles are indicated by θ and ϕ, respectively.

The vector t can be expressed in terms of the crane slew and luff angles as $$t = [A_x, B_y, C_z]$$

where

A=t cos φ cos θ

B=t cos φ sin θ

C=t sin φ and $$D = |t| = \sqrt{A^2 + B^2 + C^2}$$

is the distance between the crane origin O and the yaw actuator axis of the MRM crane head 109. The pointing direction of the crane boom g' can thus be expressed as $$g' = \left[\frac{A}{D_x}, \frac{B}{D_y}, \frac{C}{D_z}\right]$$

The yaw axis u can be expressed as $$u = [E_x, F_y, G_z]$$

where $$E = -\cos(90 - \phi)\sin(90 - \theta)$$
$$F = -\cos(90 - \phi)\cos(90 - \theta)$$
$$G = \sin(90 - \phi)$$

By operating the crane 105, the MRM crane head 109 can be positioned such that it points towards a desired liner placement point on the inner surface of the mill. Once the crane head 109 has been positioned accordingly, the slew θ, the luff ϕ, and the yaw α can be determined using e.g. sensors such as angle sensors, also known as angle encoders. The unit vector g in the direction towards this desired liner placement point can then be expressed as $$g = R_\alpha \times g' = [R_x, S_y, T_z]$$

where $R_\alpha$ is a rotation matrix defined as $$R_\alpha = \begin{bmatrix} H & I & J \\ K & L & M \\ N & O & P \end{bmatrix}$$
$$H = \cos\alpha + E^2(1 - \cos\alpha)$$
$$I = E\,F(1 - \cos\alpha) - G\sin\alpha$$
$$J = E\,G(1 - \cos\alpha) + F\sin\alpha$$
$$K = E\,F(1 - \cos\alpha) + G\sin\alpha$$
$$L = \cos\alpha + F^2(1 - \cos\alpha)$$
$$M = F\,G(1 - \cos\alpha) - E\sin\alpha$$
$$N = E\,G(1 - \cos\alpha) - F\sin\alpha$$
$$O = F\,G(1 - \cos\alpha) + E\sin\alpha$$
$$P = \cos\alpha + G^2(1 - \cos\alpha) \text{ and}$$
$$R = \frac{AH}{D} + \frac{BI}{D} + \frac{CJ}{D}$$
$$S = \frac{AK}{D} + \frac{BL}{D} + \frac{CM}{D}$$
$$T = \frac{AN}{D} + \frac{BO}{D} + \frac{CP}{D}$$

The point at which the vector w terminates on the inner surface of the mill, i.e. the intersection point between a virtual line from the crane head 109 to the inner surface of the mill in the pointing direction of the crane head 109, can be determined from $$W = t + Qg = \left[(A + QR)_x, (B + QS)_y, (C + QT)_z\right]$$

and solving for Q:

$$r^2 = (B + QS)^2 + (C + QT)^2$$
$$(S^2 + T^2)Q^2 + (2BS + 2CT)Q + (B^2 + C^2 + r^2) = 0$$
$$a = S^2 + T^2$$
$$b = 2BS + 2CT$$
$$c = B^2 + C^2 + r^2$$
$$Q = \frac{-b \pm \sqrt{b^2 - 4ac}}{2a}, \text{ where } Q > 0$$

With reference to FIGS. 7*a* and 7*b*, a similar derivation can be made in respect of a liner placement point on the mill head (similarly for both the feed head and the discharge head). Here, in addition to the parameters discussed above, the head angle β and the crane origin offset from the cone tip d are also introduced. Also, for the head cone, r will denote the radius to the cone intersection point. As will be understood, the mill heads may also be constructed as flat structures, i.e. the head angle β may be zero. In this disclosure any reference to a cone head thus also includes flat mill heads for which the head angle is zero. The point at which the vector w terminates on the cone head, i.e. the intersection point between the virtual line from the crane head 109 to the mill cone head in the pointing direction of the crane head, can be determined using the head angle β and the crane origin offset from the cone tip d as follows.

$$\tan\beta = \frac{d + W_x}{\sqrt{W_y^2 + W_z^2}}$$

$$\tan^2\beta = \frac{(d + A + QR)^2}{(B + QS)^2 + (C + QT)^2}$$

$$\tan^2\beta = \frac{(R^2)Q^2 + (2dR + 2AR)Q + (d^2 + 2dA + A^2)}{(S^2 + T^2)Q^2 + (2BS + 2CT)Q + (B^2 + C^2)}$$

$$g = \frac{hQ^2 + iQ + j}{lQ^2 + mQ + n}$$

$$(gl - h)Q^2 + (gm - i)Q + (gn - j) = 0$$

$$a = gl - h$$

$$b = gm - i$$

$$c = gn - j$$

$$Q = \frac{-b \pm \sqrt{b^2 - 4ac}}{2a}, \text{ where } Q > 0$$

Once the intended liner placement point on the inner surface of the mill (i.e. the intersection point between a virtual line from the crane head 109 to the inner surface of the mill) has been determined according to the above, the correct yaw α, roll R and pitch P angles of the wear element positioning unit, sometimes called liner positioning unit (LPU), for proper placement of the liner at the intended point can be determined as follows.

First, calculate the angle of the inner surface of the mill shell intersection point (always the shell intersection, even when facing the mill heads):

$$\rho = \tan^{-1}\frac{w_z}{w_y}$$

Then define the Euler angles

For the shell: ω=[ρ, 90, 0]

For the heads: ω=[β sin ρ, β cos ρ, ρ]

The yaw α, roll R and pitch P angles of the LPU are then calculated as follows. With reference to FIG. 6A, consider the following critical points and vectors:

P1: The crane end point, which is defined by the vector t=[$A_x$, $B_y$, $C_z$] discussed above.

V1: A normal to the yaw plane, relative to the crane end point (P1), which corresponds to u as discussed above.

P2: The mill shell intersection point, which is defined by the vector w

V2: A normal to the mill shell intersection point (P2), which can be expressed as V2=[−sin $\omega_y$ cos $\omega_x$, sin $\omega_x$,−cos $\omega_y$]

V3: A unit vector from mill intersection point (P2) towards crane end point (P1), which can be expressed as V3=w−g.

V4: The projection of V2 (i.e. of the normal to the mill shell intersection point) onto the yaw plane, which can be expressed as V4=V2−u(V2·u)

The LPU angles can then be determined as:

$$\text{Yaw} = \cos^{-1}\frac{V3 \cdot V4}{\|V3\|\|V4\|}$$

For mill shell:

$$\text{Roll} = \omega_z - \phi\cos\theta$$

$$\text{Pitch} = \omega_x - \phi\sin\theta$$

For mill heads:

$$\text{Roll} = \omega_z - \phi\sin\theta$$

$$\text{Pitch} = \omega_x - \phi\cos\theta$$

Hence, with reference again to FIG. 6A, the yaw angle α is the angle between the virtual line projected from the head 109 of the crane 105 of the MRM 100 and the z-axis of the wear element placement point projected onto the yaw plane (normal to the crane head y-axis), about the y-axis of the crane head 109.

The roll R angle is the z-axis rotation of the wear element placement point coordinate system minus the projected rotation of the crane luff angle.

The pitch angle is the x-axis rotation of the wear element placement point coordinate system minus the projected rotation of the crane luff angle.

As described herein, the yaw angle α is adjustable both manually and by means of the automated alignment. Since the intersection point of the virtual line Qg in some embodiments is depending on yaw angle α, which is also one of the parameters that the alignment means adjusts, the system will work in a closed loop manner, i.e. the intersection point will be re-calculated after each incremental adjustment by the alignment means.

It is clear that the invention as disclosed herein provides substantial advantages over prior art solutions. The task of the operator is simplified in that fine alignment of the wear element to achieve matching surfaces of the wear element and the inner surface of the mill in now done in a semi- or fully automated manner which reduces downtime of the mill. The operator only needs to move the grapple towards the intended placement point and the equipment adapts the orientation of the grapple and thus the wear element in response to the movement.

The person skilled in the art realizes that the present disclosure by no means is limited to the preferred embodiments described above. On the contrary, many modifications and variations are possible within the scope of the appended claims.

For example, even though embodiments are shown relating to grinding mills, the disclosure is by no means limited to such equipment only. The skilled person realizes that the invention as defined herein can be applied to other equipment as well where wear elements such as liners need to be handled by machines similar to the MRM described here having a plurality of degrees of freedom. For example, in other types of crushing equipment. Furthermore, even though it has been described that the virtual line originates in the crane head and that the operator directs the crane towards an intended placement point of the supporting structure, other variants are conceivable within the scope of this disclosure. For example, a virtual line can originate from just any point as long as it possible to determine the orientation thereof relative to the MRM and the supporting structure. For example, the virtual line could be defined by a laser pointer mounted to any part of the MRM or mill, such as a position where the operator is located. The laser pointer could be provided by angle encoders and thereby make it possible to determine the intersection point of the laser with the inner surface of the mill. Furthermore, the order in which the different degrees of freedom are adjusted can differ. For example, in the figures the pitch is indicated as being downstream of the roll. It is of course possible within the scope of the invention to arrange the pitch upstream of the roll instead.

Additionally, variations to the disclosed embodiments can be understood and effected by the skilled person in practicing the claimed disclosure, from a study of the drawings, the disclosure, and the appended claims.

The invention claimed is:

1. A method for positioning a wear element relative to a supporting structure using a multi axis wear element positioning equipment having a wear element positioning unit, the method comprising the steps of:

arranging a wear element positioning equipment in a replacement position relative to the supporting structure;

defining coordinates of an intersection point where a virtual line intersects a surface of the supporting structure;

align the wear element positioning unit with the surface of the supporting structure at the intersection point such that a connecting surface of the wear element carried by the wear element positioning unit matches with a corresponding connecting surface of the supporting structure at the intersection point; and wherein processing means are applied to define a common coordinate system for the multi axis wear element positioning equipment and the supporting structure and define in said common coordinate system the intersection point where the virtual line intersects a surface of the supporting structure and wherein the processing means is further applied to determine an alignment in which the wear element positioning unit is aligned with the surface of the supporting structure at the intersection point such that the connecting surface of the wear element carried by the wear element positioning unit matches with the corresponding connecting surface of the supporting structure at the intersection point, the processing means being configured to control an aligning means to orient the wear element positioning unit accordingly.

2. The method in accordance with claim 1, wherein if the processing means determines that the virtual line is directed towards a liner pick-up position, the wear element positioning equipment is instead automatically positioned into a liner pickup configuration.

3. The method in accordance with claim 2, wherein the liner pick-up position comprises a liner cart carrying replacement liner elements.

4. The method in accordance with claim 1, wherein an operator manually directs the wear element positioning unit along the virtual line towards a surface of the supporting structure and wherein the aligning means continuously adapts the orientation of the wear element positioning unit.

5. The method in accordance with claim 1, wherein an operator manually directs the wear element positioning unit along a virtual line towards a surface of the supporting structure and wherein the aligning means adapts the position of the wear element positioning unit in response to an operation of an alignment actuator.

6. The method in accordance with claim 1, wherein the virtual line originates from the multi axis wear element positioning equipment.

7. The method in accordance with claim 1, wherein the virtual line is defined by directing the wear element positioning unit towards the surface of the supporting structure.

8. The method in accordance with claim 1, wherein the virtual line originates from an attachment point of the wear element positioning unit to the multi axis wear element positioning equipment.

9. The method in accordance with claim 1, wherein one or more of a yaw angle; roll angle of the wear element positioning unit; and pitch angle of the wear element positioning unit can be adjusted by the aligning means.

10. The method in accordance with claim 1, wherein the wear element positioning unit is arranged on a telescopically extendable crane.

11. The method in accordance with claim 10, wherein a slew angle of the telescopically extendable crane can be adjusted by an operator.

12. The method in accordance with claim 10, wherein a luff angle of the telescopically extendable crane can be adjusted by an operator.

13. The method in accordance with claim 10, wherein a telescopic extension of the telescopically extendable crane can be adjusted by an operator.

14. The method in accordance with claim 10, wherein the common coordinate system emanates in the origin of the telescopically extendable crane.

15. The method in accordance with claim 10, comprising adjustment of the position of the intersection point by adjusting one or more of the following: a yaw angle of the wear element positioning unit; a slew angle of the telescopically extendable crane; a luff angle of the telescopically extendable crane; the telescopic extension of the crane; and a telescopic extension of a beam.

16. The method in accordance with claim 1, wherein a yaw angle of the wear element positioning unit can be adjusted by an operator.

17. The method in accordance with claim 1, wherein the supporting structure comprises a grinding mill.

18. The method in accordance with claim 17, wherein the grinding mill can be divided into distinct sections.

19. The method in accordance with claim 18, wherein the distinct sections comprise a feed head; a shell; and a discharge head.

20. The method in accordance with claim 18, wherein separate common coordinate systems are defined for each of the distinct sections and the wear element positioning equipment.

21. The method in accordance with claim 20, wherein the position of the intersection point determines which common coordinate system that shall apply.

22. A system for positioning a wear element relative to a supporting structure, the system comprising a multi axis wear element positioning equipment having a wear element positioning unit, wherein the wear element positioning equipment can be arranged in a replacement position relative to the supporting structure;

processing means arranged to determine coordinates of an intersection point where a virtual line intersects a surface of the supporting structure;

wherein the processing means is further arranged to automatically determine an orientation of the wear element positioning unit in which a wear element carried by the wear element positioning unit is aligned with the surface of the supporting structure at the intersection point such that a connecting surface of the wear element matches with a corresponding connecting surface of the supporting structure at the intersection point, the processing means being configured to control an aligning means to orient the wear element positioning unit accordingly; and wherein the processing means are applied to define a common coordinate system for the multi axis wear element positioning equipment and the supporting structure and define in said common coordinate system the intersection point where the virtual line intersects a surface of the supporting structure.

23. The system in accordance with claim 22, wherein the virtual line originates from the multi axis wear element positioning equipment.

24. The system in accordance with claim 23, wherein the virtual line is defined in that the wear element positioning unit is arranged to be directed towards the surface of the supporting structure.

25. The system in accordance with claim 22, wherein the virtual line originates from an attachment point of the wear element positioning unit to the multi axis wear element positioning equipment.

26. The system in accordance with claim 22, wherein one or more of yaw angle of the wear element positioning unit; a roll angle of the wear element positioning unit; and a pitch angle of the wear element positioning unit can be adjusted by the aligning means.

27. The system in accordance with claim 22, wherein the wear element positioning unit is arranged on a telescopically extendable crane.

28. The system in accordance with claim 27, wherein a slew angle of the telescopically extendable crane can be adjusted by an operator.

29. The system in accordance with claim 27, wherein a luff angle of the telescopically extendable crane can be adjusted by an operator.

30. The system in accordance with claim 27, wherein a telescopic extension of the telescopically extendable crane can be adjusted by an operator.

31. The system in accordance with claim 27, wherein a common coordinate system for the multi axis wear element positioning equipment and the supporting structure emanates in the origin of the telescopically extendable crane.

32. The system in accordance with claim 27, wherein the position of the intersection point can be adjusted by adjusting one or more of the following: the yaw of the wear element positioning unit; the slew angle of the telescopically extendable crane; the luff angle of the telescopically extendable crane; the telescopic extension of the crane; and the telescopic extension of the beam.

33. The system in accordance with claim 22, wherein a yaw angle of the wear element positioning unit can be adjusted by an operator.

34. The system in accordance with claim 22, wherein the supporting structure comprises a grinding mill.

35. The system in accordance with claim 34, wherein the grinding mill can be divided into distinct sections.

36. The system in accordance with claim 35, wherein the distinct sections comprise a feed head; a shell; and a discharge head.

37. The system in accordance with claim 35, wherein separate common coordinate systems are defined for each of the distinct sections and the wear element positioning equipment.

38. The system in accordance with claim 37, wherein the position of the intersection point determines which common coordinate system that shall apply.

39. The system in accordance with claim 22, wherein an operator manually directs the wear element positioning unit along a virtual line towards a surface of the supporting structure and wherein the aligning means is configured to continuously adapt the position of the wear element positioning unit.

40. The system in accordance with claim 22, wherein an operator manually directs the wear element positioning unit along a virtual line towards a surface of the supporting structure and wherein the aligning means is configured to adapt the position of the wear element positioning unit in response to an operation of an alignment actuator.

41. The system in accordance with claim 22, wherein the processing means is arranged to determine if the virtual line is directed towards a liner pick-up position.

42. The system in accordance with claim 41, wherein if the virtual line is directed towards the liner pick-up position, the wear element positioning equipment is instead automatically positioned into a liner pickup configuration.

* * * * *